US009201785B2

(12) United States Patent
Tan et al.

(10) Patent No.: US 9,201,785 B2
(45) Date of Patent: Dec. 1, 2015

(54) DATA WRITING METHOD, MEMORY CONTROLLER AND MEMORY STORAGE APPARATUS

(71) Applicant: PHISON ELECTRONICS CORP., Miaoli (TW)

(72) Inventors: Kheng-Chong Tan, Miaoli (TW); Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 205 days.

(21) Appl. No.: 13/958,627

(22) Filed: Aug. 5, 2013

(65) Prior Publication Data

US 2014/0372667 A1 Dec. 18, 2014

(30) Foreign Application Priority Data

Jun. 14, 2013 (TW) .............................. 102121184 A

(51) Int. Cl.
*G06F 12/02* (2006.01)
*G06F 11/10* (2006.01)
*G06F 3/06* (2006.01)

(52) U.S. Cl.
CPC ........ *G06F 12/0246* (2013.01); *G06F 11/1048* (2013.01); *G06F 3/0619* (2013.01); *G06F 3/0656* (2013.01); *G06F 3/0679* (2013.01); *G06F 2212/7203* (2013.01)

(58) Field of Classification Search
CPC .... G06F 3/0619; G06F 3/0656; G06F 3/0679
USPC ......................................................... 711/103
See application file for complete search history.

(56) References Cited

U.S. PATENT DOCUMENTS

| | | | |
|---|---|---|---|
| 2006/0074960 A1* | 4/2006 | Goldschmidt et al. ........ 707/102 |
| 2007/0300121 A1* | 12/2007 | Cooper ................... G06F 11/28 714/755 |
| 2013/0297855 A1* | 11/2013 | Gupta et al. ................... 711/103 |
| 2014/0068378 A1* | 3/2014 | Yoshii et al. ................... 714/764 |
| 2014/0219034 A1* | 8/2014 | Gomez et al. ............ 365/185.22 |

\* cited by examiner

*Primary Examiner* — Mark Giardino, Jr.
*Assistant Examiner* — Yong Choe
(74) *Attorney, Agent, or Firm* — Jianq Chyun IP Office

(57) ABSTRACT

A data writing method for a rewritable non-volatile memory module is provided. The method includes receiving a write command and data corresponding to the write command from a host system and temporarily storing the data into a buffer memory, and the data includes a plurality of sub-data streams. The method still includes transmitting the sub-data streams into the rewritable non-volatile memory module, thereby writing the sub-data streams into at least one physical erasing unit of the rewritable non-volatile memory module. The method further includes generating parity information based on at least portion of the sub-data streams; storing the parity information into the buffer memory and deleting the data from the buffer memory. Accordingly, the method can effectively utilize the storage space of the buffer memory.

24 Claims, 11 Drawing Sheets

DATA WRITING METHOD, MEMORY CONTROLLER AND MEMORY STORAGE APPARATUS

CROSS-REFERENCE TO RELATED APPLICATION

This application claims the priority benefit of Taiwan application serial no. 102121184, filed on Jun. 14, 2013. The entirety of the above-mentioned patent application is hereby incorporated by reference herein and made a part of this specification.

BACKGROUND

1. Technology

The present invention relates to a data writing method for a rewritable non-volatile memory module, a memory controller and a memory storage apparatus using the method.

2. Description of Related Art

Along with the rapid growth of digital cameras, cell phones, and MP3 devices in recent years, the consumers' demand for storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, such as a mobile phone, a personal digital assistant (PDA), a notebook computer, and so on. Therefore, the flash memory industry has become a very popular part of the electronic industry in recent years.

In general, a buffer memory is disposed in a flash memory controller of a flash memory storage apparatus, and when the flash memory storage apparatus receives a write command and a plurality of data, the flash memory controller temporarily stores the data into the buffer memory and then writes the data into corresponding physical pages according to the arrangement of the physical pages. However, physical pages constituted by one word line have a coupling effect by each other, and therefore if there is a program failure in a physical page, data stored in another physical page having the coupling effect with the physical page may be lost. For example, one physical block has a plurality of physical page set, and each of the physical page set includes one lower physical pages and one upper physical page. When there is a program failure in an upper physical page of a physical page set, data stored in the lower physical page of the same physical page set may be lost. In particular, based on the program sequence of the physical pages defined in the flash memory standard, several upper physical pages may be proceeded to program after several lower physical pages have been programmed. Therefore, after a write command (hereinafter referred to as "the first write command") has been executed, only lower physical pages is written with data in some physical page sets, and upper physical pages of the physical page sets may be written with data at next write command (hereinafter referred to as "the second write command"). In this case, if a program failure occurs during the execution of the second write command for writing data into upper physical pages, data written in the lower physical pages by executing the first write command may be lost. In order to prevent the data stored in the lower physical pages from losing, the flash memory controller may keep the data in the buffer memory and when it is confirmed that the data stored in the lower physical pages dose not lost due to the programming of other physical pages, the data may be deleted from the buffer memory. Accordingly, a flash memory storage system is needed to equip with a buffer memory having a larger capacity, thereby increasing the cost of manufacturing the flash memory storage system. In particular, in a flash memory storage system equipped with a plurality of flash memory dies, a buffer memory having a larger capacity is needed to temporarily store data written by the host system.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method for a rewritable non-volatile memory module, and a memory controller and a memory storage apparatus using the method, which can reduce a storage space of a buffer memory needed for executing write commands and prevent data from losing.

According to an exemplary embodiment of the present invention, a data writing method for a rewritable non-volatile memory module is provided, wherein the rewritable non-volatile memory module has at least one memory die, the memory die has a plurality of physical erasing unit and each of the physical erasing unit includes a plurality of physical programming units. The data writing method includes receiving a first write command and first data corresponding to the first write command and temporarily storing the first data into a buffer memory, wherein the first data includes a plurality of sub data streams. The method also includes transmitting the sub data streams from the buffer memory to the writable non-volatile memory module to write the sub data streams into at least one first physical erasing unit; generating parity information according to at least portion of the sub data streams; and storing the parity information into the buffer memory and deleting the first data from the buffer memory.

An exemplary embodiment of the present invention provides a memory controller for controlling the rewritable non-volatile memory module. The memory controller includes a host interface, a memory interface, a buffer memory, a parity information encoding and decoding circuit and a memory management circuit. The host interface is coupled to the host system. The memory interface is configured to couple to the rewritable non-volatile memory module, wherein the rewritable non-volatile memory module has at least one memory die, the memory die has a plurality of physical erasing unit and each of the physical erasing unit includes a plurality of physical programming units. The memory management circuit couples to the host interface, the memory interface, the buffer memory, and the parity information encoding and decoding circuit. The memory management circuit is configured to receive a first write command and first data corresponding to the first write command and temporarily store the first data into a buffer memory, wherein the first data includes a plurality of sub data streams. Additionally, the memory management circuit is further configured to transmit the sub data streams from the buffer memory to the rewritable non-volatile memory module to write the sub data streams into at least one first physical erasing unit. And, the parity information encoding and decoding circuit is configured to generate parity information according to at least portion of the sub data streams; and the memory management circuit is further configured to store the parity information into the buffer memory and delete the first data from the buffer memory.

According to an exemplary embodiment of the present invention, a memory storage apparatus including a connector, a rewritable non-volatile memory module and a memory controller is provided. The connector is coupled to the host system. The rewritable non-volatile memory module has at least one memory die, the memory die has a plurality of physical erasing unit and each of the physical erasing unit includes a plurality of physical programming units. The memory controller has a buffer memory and is coupled to the connector and the rewritable non-volatile memory module. The memory controller is configured to receive a first write command and first data corresponding to the first write command and temporarily store the first data into a buffer memory, wherein the first data includes a plurality of sub data streams. Additionally, the memory controller is further configured to transmit the sub data streams from the buffer memory to the rewritable non-volatile memory module to write the sub data streams into at least one first physical erasing unit. And, the memory controller is configured to generate parity information according to at least portion of the sub data streams, store the parity information into the buffer memory and delete the first data from the buffer memory.

In light of the foregoing, the data writing method, the memory controller and the memory storage apparatus described in the embodiments of the invention can execute write commands with a smaller buffer memory while data reliability can be ensured.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

DESCRIPTION OF EMBODIMENTS

Figure 1:
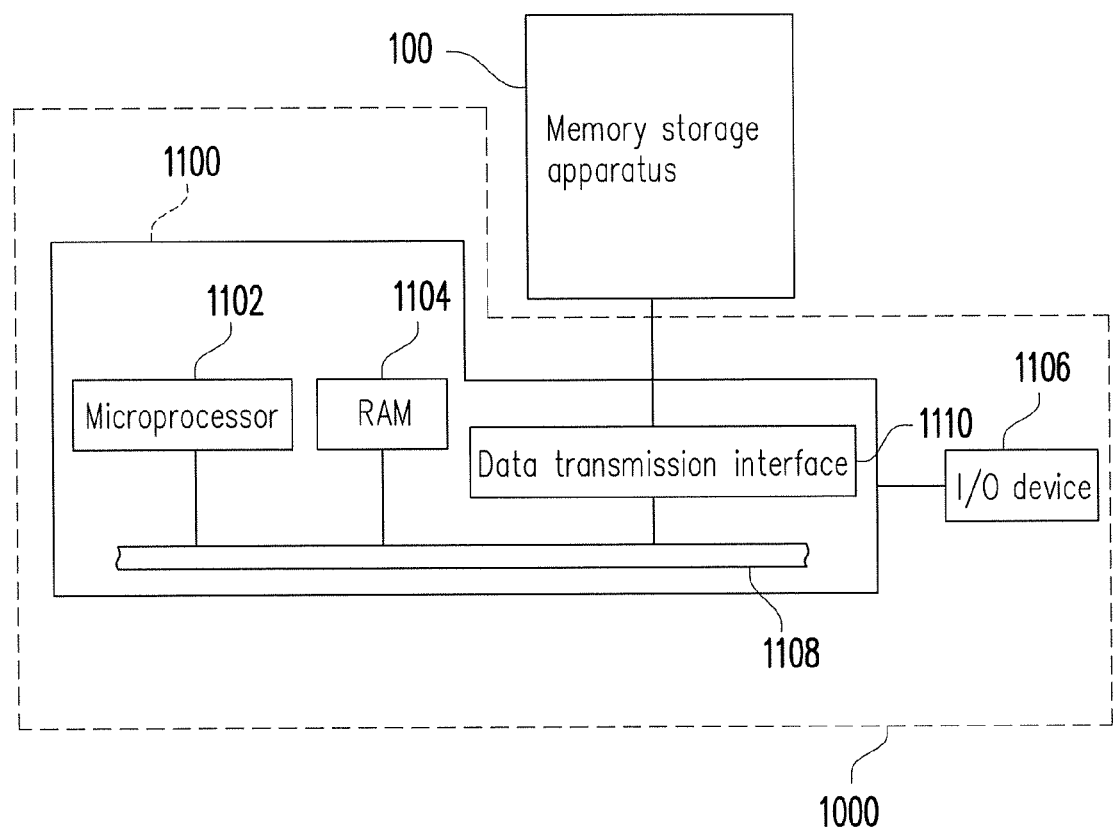
FIG. 1 illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage apparatus (i.e., a memory storage system), typically, includes a rewritable non-volatile memory module and a controller (i.e., a control circuit). The memory storage apparatus is usually used together with a host system, such that the host system can write data into or read data from the memory storage apparatus.

FIG. 1 illustrates a host system and a memory storage apparatus according to an exemplary embodiment of the present invention.

Figure 2:
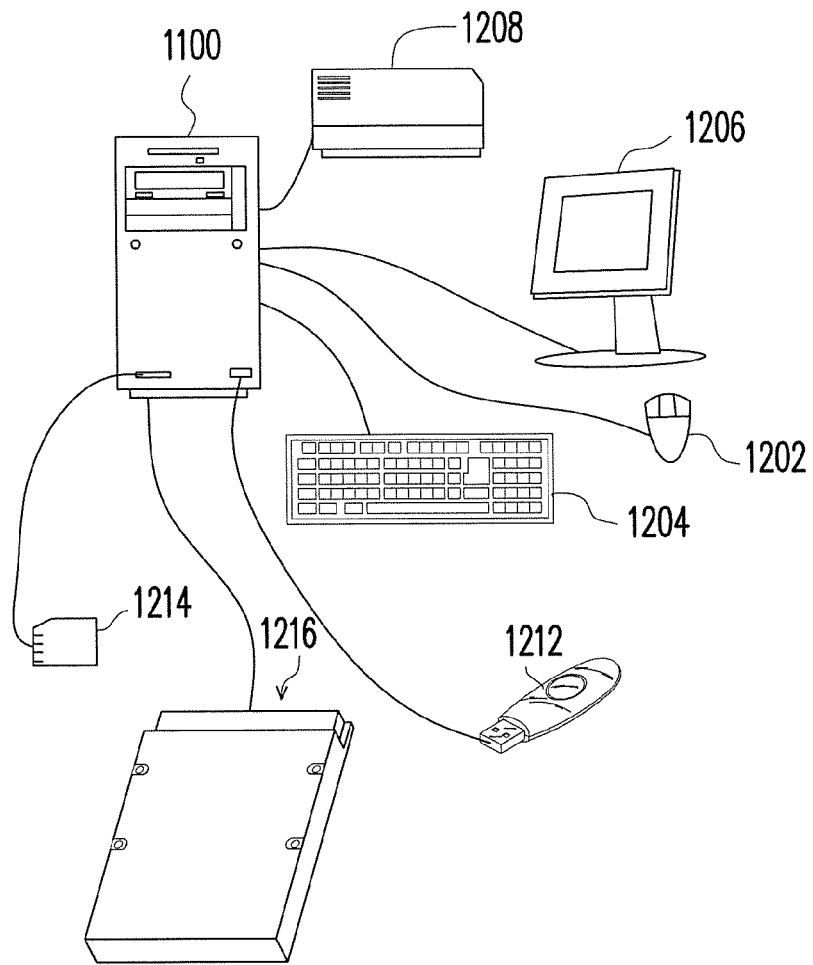
FIG. 2 schematically illustrates a computer, an input/output (I/O) device, and a memory storage apparatus according to the first exemplary embodiment of the present invention.

Referring to FIG. 1, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood that, the devices depicted in FIG. 2 should not be construed as limitations to the present disclosure, and the I/O device 1106 may include other devices as well.

In the exemplary embodiment of the present invention, the memory storage apparatus 100 is coupled to other devices of the host system 1000 through the data transmission interface 1110. By using the microprocessor 1102, the random access memory (RAM) 1104 and the Input/Output (I/O) device 1106, the data can be write into the memory storage apparatus 100 or can be read from the memory storage apparatus 100. For instance, the memory storage apparatus 100 may be a non-volatile memory storage apparatus, such as a flash drive 1212, a memory card 1214, or a solid state drive (SSD) 1216 as shown in FIG. 2.

Figure 3:
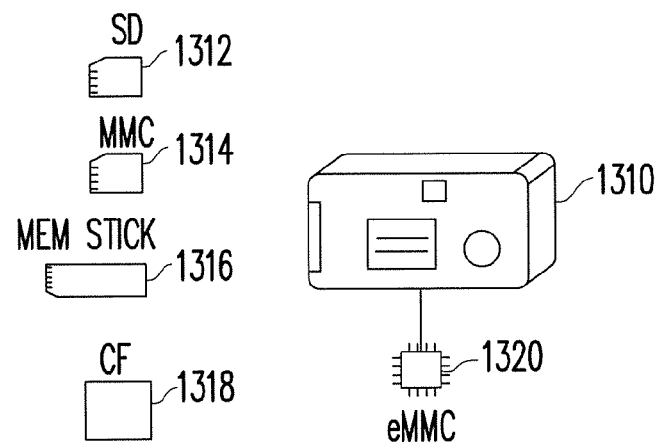
FIG. 3 illustrates a host system and a memory storage apparatus according to an exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage apparatus is an SD card 1312, an MMC card 1314, a memory stick 1316, a CF card 1318*n* or an embedded storage apparatus 1320 (as shown in FIG. 3). The embedded storage device 1320 includes an embedded MMC (eMMC). It should be noted that the eMMC is directly coupled to a substrate of the host system.

Figure 4:
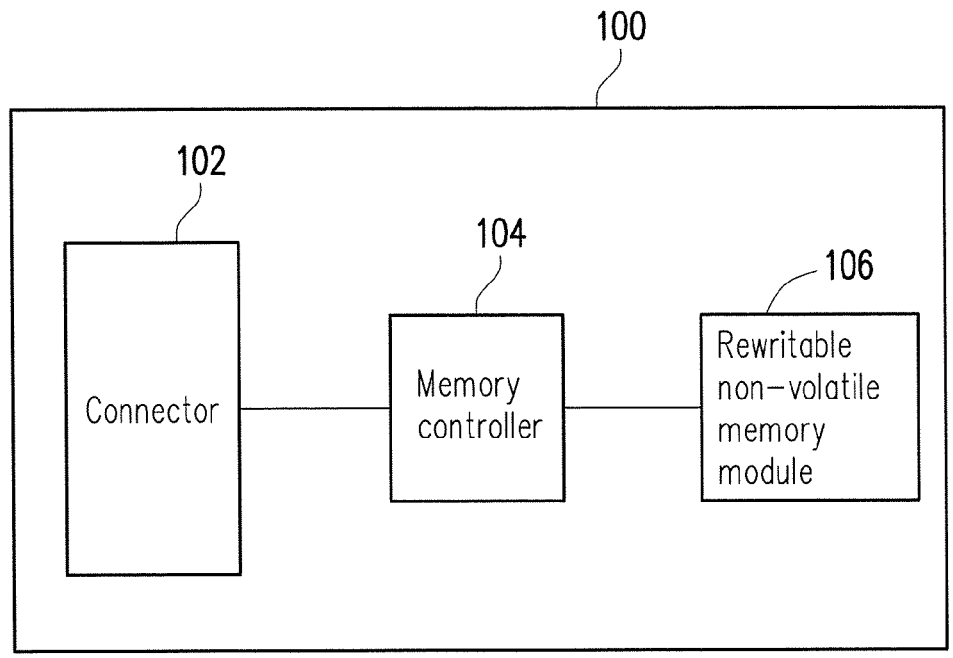
FIG. 4 is a schematic block diagram illustrating a memory storage apparatus according to one exemplary embodiment of the present invention.

FIG. 4 is a schematic block diagram illustrating a flash memory storage apparatus according to one exemplary embodiment of the present invention.

Referring to FIG. 4, the memory storage apparatus 100 includes a connector 102, a memory controller 104, and a rewritable non-volatile memory module 106.

In the present exemplary embodiment, the connector 102 complies with the serial advanced technology attachment (SATA) standard. However, it should be understood that the present invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the secure digital (SD) standard, the serial advanced technology attachment (SATA) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards.

The memory controller 104 is configured to execute a plurality of logic gates or control commands which are implemented in a hardware form or in a firmware form and performing the operations such as data writing, reading or erasing in the rewritable non-volatile memory module 106 according to the command of the host system 1000.

The rewritable non-volatile memory module 106 is coupled to the memory controller 104 and is configured to store data written by the host system 1000.

Figure 5:
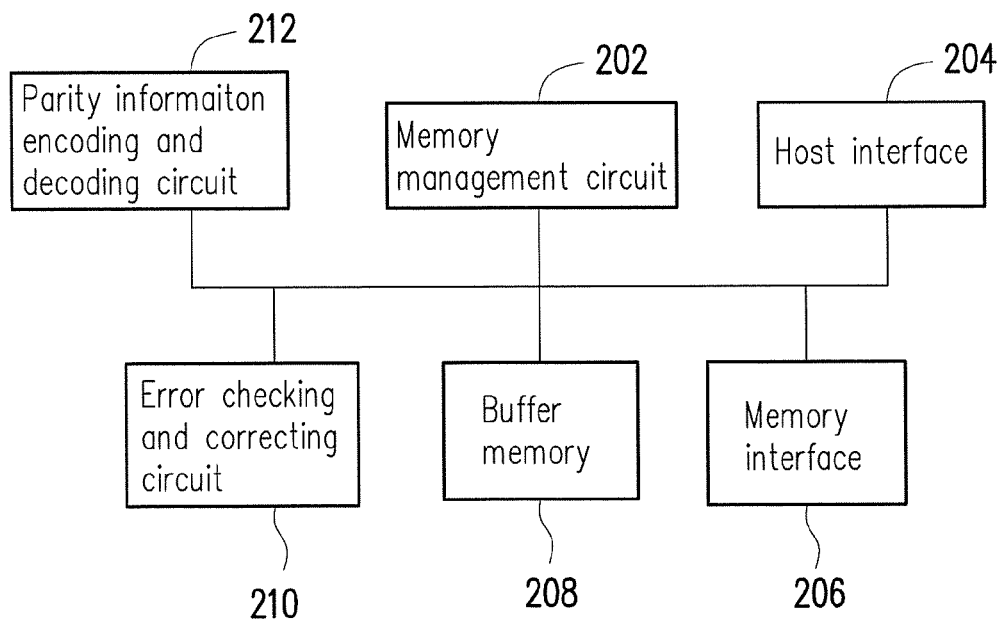
FIG. 5 is a schematic block diagram illustrating a memory controller according to an exemplary embodiment of the present invention.

FIG. 5 is a schematic block diagram illustrating a memory controller according to an exemplary embodiment of the present invention. It should be understood that the memory controller depicted in FIG. 5 is merely exemplary and should not be construed as a limitation to the present invention.

Referring to the FIG. 5, the memory controller 104 includes a memory management circuit 202, a host interface 204, a memory interface 206, a buffer memory 208, an error checking and correcting circuit 210 and a parity information encoding and decoding circuit 212.

The memory management circuit 202 is configured to control the whole operation of the memory controller 104. Particularly, the memory management circuit 202 has a plurality of control instructions; when the memory storage apparatus 100 is operated, the control instructions are executed to perform a data writing operation, a data reading operation, a data erasing operation, and so on.

In the present exemplary embodiment, the control commands of the memory management circuit 202 are implemented in a form of a firmware. For example, the memory management circuit 202 includes a microprocessor unit (not shown) and a read-only memory (ROM, not shown), wherein the control instructions are burnt in the read-only memory. When the memory storage apparatus 100 is operated, the control instructions are executed by a microprocessor unit to write, read, and erase data.

In another exemplary embodiment of the present invention, the control instructions of the memory management circuit 202 may also be stored in a specific block (for example, a system block in a memory module exclusively used for storing system data) of the rewritable non-volatile memory module 106 as a programming code. Additionally, the memory management circuit 202 may have a microprocessor unit (not shown), a read-only memory (not shown) and a random access memory (not shown). In particular, the ROM has boot codes, and when the memory controller 104 is enabled, the microprocessor unit first executes the boot codes to load the control instructions from the rewritable non-volatile memory module 106 into the RAM of the memory management circuit 202. The microprocessor unit then executes the control instructions to write, read, and erase data.

Furthermore, as in another exemplary embodiment, the control instructions in the memory management circuit 202 are implemented in a form of hardware. For example, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is configured to manage physical blocks of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to receive and identify the commands and the data transmitted by the host system 1000. Namely, the commands and data transmitted by the host system 1000 are passed to the memory management circuit 202 through the host interface 204. In the present exemplary embodiment, the host interface 204 complies with the SATA standard. However, it should be understood that the present invention is not limited thereto, and the host interface 204 may comply with the PATA standard, the IEEE 1394 standard, the PCI express standard, the SD standard, the SATA standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 for accessing the rewritable non-volatile memory module 106. In other words, data to be written into the rewritable non-volatile memory module 106 is converted to an acceptable format for the rewritable non-volatile memory module 106 by the memory interface 206.

The buffer memory 208 is coupled to the memory management circuit 202 and configured to temporarily store data and commands from the host system 1000 or data from the rewritable non-volatile memory module 106.

The error checking and correcting circuit 210 is coupled to the memory management circuit 202 and configured to perform an error checking and correcting process to assure the accuracy of data. To be more specific, when the memory management 202 receives a write command from the host system 1000, the error checking and correcting circuit 210 generates an error checking and connecting code (ECC code) corresponding to the data of the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding error checking and correcting code is also be read, and the error checking and correcting circuit 210 executes the error checking and correcting process to the read data according to the ECC code. To be specific, the error checking and correcting circuit 210 is designed to have the capability to check and correct an amount of error bits. Herein, the amount is referred to as the maximum number of error correcting bits. For example, the maximum number of error correcting bits is 24. If the number of error bits occurred on the read data is smaller than 24, the error checking and correcting circuit 212 can correct the error bits based on the corresponding ECC code. If the number of error bits occurred on the read data is not smaller than 24, the error checking and correcting circuit 212 sends a message indicating the failure of error correcting and the memory management circuit 202 transmits a message indicating that data is lost to the host system 1000.

The parity information encoding and decoding circuit 212 is coupled to the memory management circuit 202 and configured to encode a plurality of data, that is temporarily stored in the buffer memory 208 and about to be written into a plurality of physical programming unit, to generate parity information according to an indication from the memory management circuit 202. Additionally, the parity information encoding and decoding circuit 212 decodes data stored in the physical programming units with the parity information to correct an error bit occurred in the data according to an indication from the memory management circuit 202. That is, if an error bit occurs in data stored in one of the physical programming units, the parity information encoding and decoding circuit 212 decodes the data with the generated parity information to correct the error bit. Herein, parity information generated by the parity information encoding and decoding circuit 212 may be parity checking codes, channel coding or other type of encoding. For example, Hamming codes, low density parity check codes, turbo codes or Reed-Solomon codes may be applied. For example, if the ratio of the length of data and the length of parity information thereof is m: n, m pieces of data are correspond to n pieces of parity information, wherein m and n are positive integers and in a case where the number of error data is smaller than n, the error data can be corrected based on the parity info nation. In general, m is larger than n; however, the present invention is not limited thereto. And, the values of m and n are not limited thereto.

Figure 6:
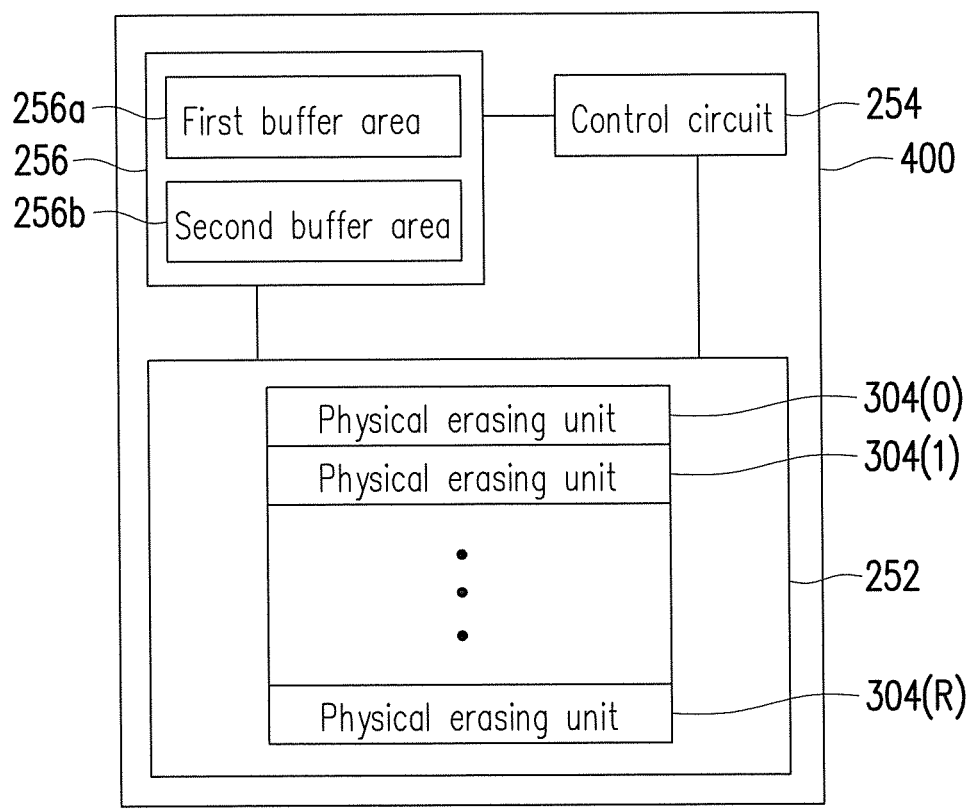
FIG. 6 is a schematic diagram of a rewritable non-volatile memory module according to an exemplary embodiment of the present invention.

FIG. 6 is a schematic diagram of a rewritable non-volatile memory module according to an exemplary embodiment of the present invention.

The rewritable non-volatile memory module 106 includes a memory die 400. The memory die 400 includes a memory cell array 252, a control circuit 254, and a data input/output (I/O) buffer 256.

The memory cell array 252 includes physical erasing units 304(0)~304(R). Each of the physical erasing units includes at leas one physical programming unit and the physical programming units which belong to the same physical erasing unit can be written separately but erased at the same time. For example, each physical erasing unit is composed of 128 physical programming units. However, the present invention is not limited thereto, and each of the physical erasing units may also be comprised of 64, 256, or any other number of physical programming units.

To be more specific, the physical erasing unit is the minimum erasing unit. That is to say, each of the physical erasing unit has a minimum number of memory cells for being erased altogether. Generally, a physical programming unit is the minimum unit for programming. In other words, a physical programming unit is the minimum unit for writing the data.

To be specific, an NAND flash memory may be classified into a Single Level Cell (SLC) NAND flash memory, a Multi Level Cell (MLC) NAND flash memory, or a Trinary Level Cell (TLC) NAND flash memory according to the number of bits which each memory cell thereof is capable of storing. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical programming unit is composed of several memory cells arranged on the same word line. Since each memory cell in the SLC NAND flash memory can store one bit of data, several memory cells arranged on the same word line in the SLC NAND flash memory correspond to one physical programming unit.

By contrast, a floating gate storage layer in each memory cell of the MLC NAND flash memory can store two bits of data, and each storage state (i.e., "11," "10," "01," or "00") includes the least significant bit (LSB) and the most significant bit (MSB). For instance, the first bit from the left of the storage states is the LSB, and the second bit from the left of the storage states is the MSB. Accordingly, several memory cells arranged on the same word line may constitute two physical programming units, wherein the physical programming units constituted by the LSB and the MSB of the memory cells are lower physical programming units and upper physical programming units, respectively. In particular, the speed of writing data into the lower physical programming unit is faster than writing data into the upper physical programming unit, and when a program failure occurs in the process of programming the upper physical programming unit, the data stored in the lower physical programming unit corresponding to the programmed upper physical programming unit may be lost.

Similarly, each memory cell in the TLC NAND flash memory can store three bits of data, and each storage state (i.e., "111," "110," "101," "100," "011," "010," "001," or "000") includes the first bit (i.e., the LSB), the second bit (i.e., the center significant bit, CSB), and the third bit (i.e., the MSB) from the left of the storage states. Accordingly, several memory cells arranged on the same word line may constitute three physical programming units, wherein the physical programming units constituted by the LSB are lower physical programming units, the physical programming units constituted by the CSB are middle physical programming units and the physical programming units constituted by the MSB of the memory cells are upper physical programming units. Similarly, comparing to the middle and upper physical programming units, the lower physical programming units have the higher stability and the speed of writing data into the lower physical programming unit is faster than writing data into the middle and upper physical programming units.

Each physical programming unit usually includes a data bit area and a redundant bit area. The data bit area is used for storing user data, and the redundant bit area is used for storing system data (e.g., control information and error checking and correcting (ECC) codes). In this exemplary embodiment, each of the physical programming units is constituted by 4 physical access addresses, and a capacity of each of the physical access addresses is 512 bytes. However, in another exemplary embodiment, the data bit area may contain less or more physical access address, and the number and size of physical access address is not limited thereto. For example, in an exemplary embodiment, one physical erasing unit is one physical block and one physical programming unit is one physical page or physical sector, but the present invention is not limited thereto.

In the present exemplary embodiment, the rewritable non-volatile memory module 106 is a MLC NAND flash memory module. However, the present invention is not limited thereto. The rewritable non-volatile memory module 106 may also be a SLC NAND flash memory module, a TLC NAND flash memory module, other flash memory modules or other memory modules with the same property.

The control circuit 254 is configured for programming data to the memory cell array 252 or reading data from the memory cell array 252 based on the commands from the memory controller 104.

The data I/O buffer 256 includes a first buffer area 256a and a second buffer area 256b. The first buffer area 256a and the second buffer area 256b are independent from each other and can respectively have individual capacity. For instance, the capacity of the first buffer area 256a and the capacity of the second buffer area 256b are respectively the capacity of one physical programming unit for temporarily storing data to be written into the memory cell array 202 or for temporarily storing data read from the memory cell array 202.

The process of writing data into the rewritable non-volatile memory module 106 includes a data transmission stage and a data programming stage. In the data transmission stage, the memory controller 104 (or the memory management circuit 202) transmits the to-be-written page data to the first buffer area 256a, and the to-be-written page data is then moved to the second buffer area 256b. In the data programming stage, the to-be-written page data is programmed from the second buffer area 256b to the memory cell array 252. Specifically, when the to-be-written page data is moved from the first buffer area 256a to the second buffer area 256b, the memory controller 104 (or the memory management circuit 202) receives a confirmation message indicating that the write command is completed from the flash memory module 106, and the memory controller 204 can then transmit (or issue) the next command to the rewritable non-volatile memory module 106. Here, the first buffer area 256a is referred to as a data cache area, and the second buffer area 256b is referred to as a page buffer area. The writing operation with the second buffer area 256b is referred to as cache program operation.

It should be mentioned that the memory controller 104 (the memory management circuit 202) can instruct the rewritable non-volatile memory module 106 not to write data into the second buffer area 256b according to this exemplary embodiment. For instance, when there is no second buffer area 256b in the data I/O buffer 256, or when the second buffer area 256b is not used for data storage due to certain reasons, the rewritable non-volatile memory module 106 can directly program the to-be-written page data from the first buffer area 256a to the memory cell array 252 based on the command from the memory controller 104 (or the memory management circuit 202). In this case, the memory controller 104 (or the memory management circuit 202) does not receive the confirmation message indicating that the write command is completed until the rewritable non-volatile memory module 106 programs the page data from the first buffer area 256a to the memory cell array 252.

It should be noted that the example shown in FIG. 6 is not limited the present invention and in another exemplary embodiment, the data I/O buffer 256 may have one or more than two buffer areas.

Figure 7:
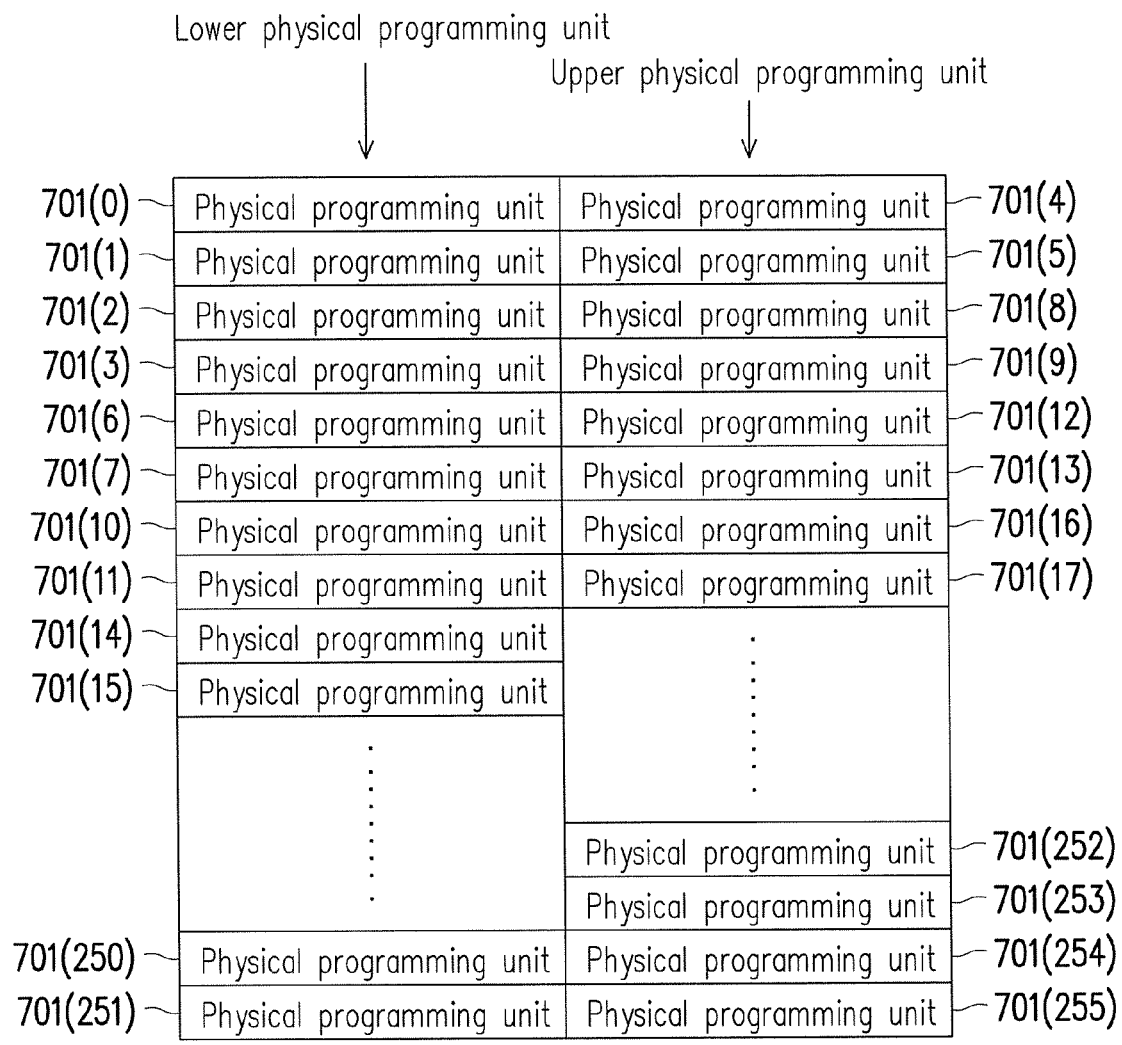
FIG. 7 is a diagram illustrating physical programming units in one physical erasing unit according to the exemplary embodiment of the present invention.

FIG. 7 is a diagram illustrating physical programming erasing units in one physical erasing unit according to the exemplary embodiment of the present invention.

Referring to FIG. 7, a physical erasing unit of a MLC NAND flash memory module is taken as an example to explain the arrangement of physical programming units and the physical erasing unit includes 256 physical programming units. The physical erasing unit 304(0) includes physical programming units 701(0)~701(255). The physical programming unit 701(0) and the physical programming unit 701(4) are on the same word line, the physical programming unit 701(1) and the physical programming unit 701(5) are on the same word line, the physical programming unit 701(2) and the physical programming unit 701(8) are on the same word line, the physical programming unit 701(3) and the physical programming unit 701(9) are on the same word line, the physical programming unit 701(6) and the physical programming unit 701(12) are on the same word line, the physical programming unit 701(7) and the physical programming unit 701(13) are on the same word line, the physical programming unit 701(10) and the physical programming unit 701(16) are on the same word line, the physical programming unit 701(11) and the physical programming unit 701(17) are on the same word line, and so on. Herein, the physical programming units 701(0), 701(1), 701(2), 701(3), 701(6), 701(7), 701(10), 701(11), 701(14), 701(15) . . . 701(250) and 701(251) are lower physical programming units and the physical programming units 701(4), 701(5), 701(8), 701(9), 701(12), 701(13), 701(16), 701(17) . . . 701(252), 701(253), 701(254) and 701(255) are upper physical programming units. It should be understood that the configuration depicted in FIG. 7 is merely exemplary and should not be construed as a limitation to the present invention.

Figure 8:
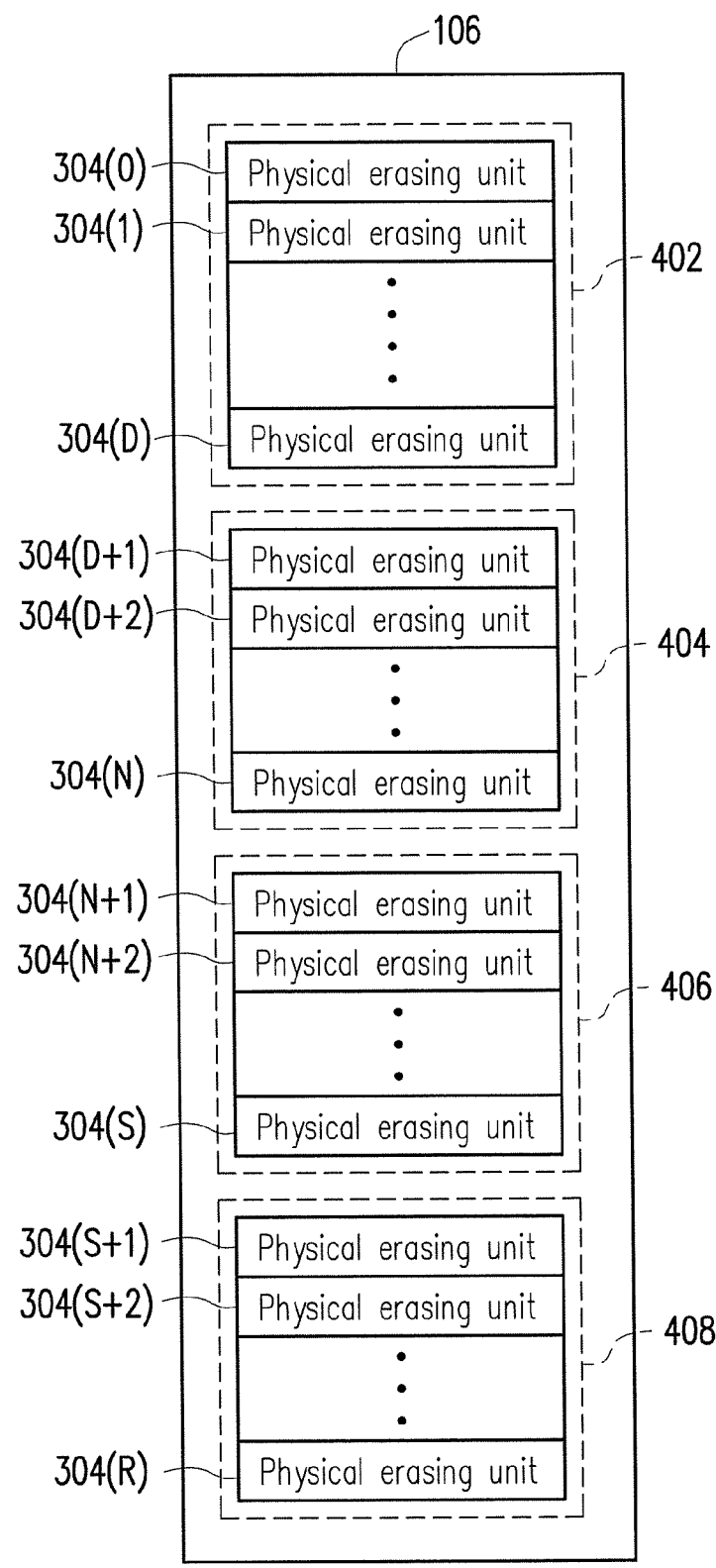
FIGS. 8 and 9 are schematic diagrams of managing a rewritable non-volatile memory module according to an exemplary embodiment of the present invention.
Figure 9:
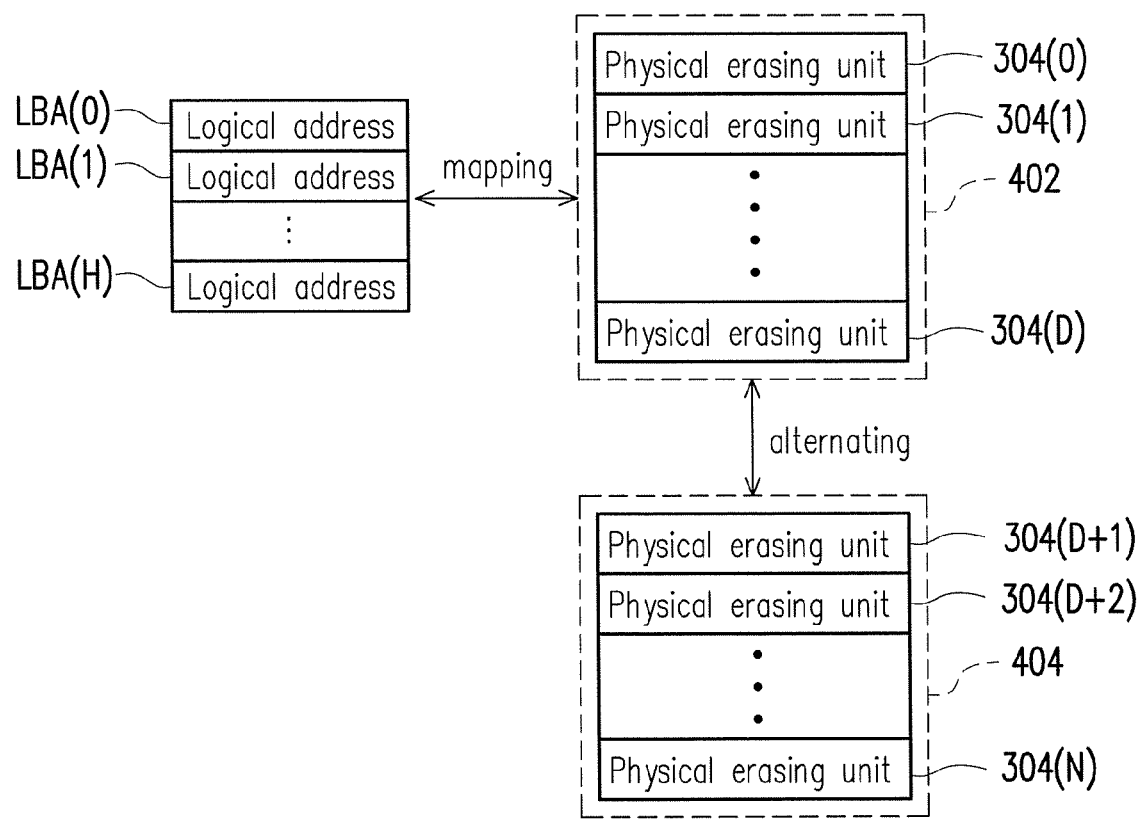

FIGS. 8 and 9 are schematic diagrams of managing a rewritable non-volatile memory module according to an exemplary embodiment of the present invention.

It should be understood that the terms used herein for describing the operations (for example, "get", "select", "replace", "group", and "alternate", etc) performed on the physical blocks of the memory module 106 refer to logical operations performed on these physical blocks. Namely, the physical erasing units in the rewritable non-volatile memory module 106 are only logically operated and the actual positions thereof are not changed.

Referring to FIG. 8, the memory controller 104 (or the memory management circuit 202) logically groups the physical erasing units 304(0)~304(R) into (or assigns the physical erasing units 304(0)~304(R)) a data area 402, a spare area 404, a system area 406, and a replacement area 408.

The physical erasing units logically belonging to the data area 402 and the spare area 404 are used for storing data written by the host system 1000. Specifically, the physical erasing units (also referred to as data erasing units) in the data area 402 are considered physical erasing units already containing data, and physical erasing units (also referred to as spare physical erasing units) in the spare area 404 are physical erasing units used for writing new data. For instance, when a write command and data to be written are received from the host system 1000, the memory controller 104 (or the memory management circuit 202) selects a physical erasing unit from the spare area 404, organizes the data to be written into the selected physical erasing unit, and writes the data into the selected physical erasing unit.

The physical erasing units logically belonging to the system area 406 are used for recording system data, which includes information related to the manufacturer and a model of the memory module, the number of the zones in each memory module, the number of the physical erasing units in each zone, the number of the physical programming units in each physical erasing unit, and so forth. In particular, when a physical erasing unit is used for writing with the system data, the memory controller 104 (or the memory management circuit 202) records a system physical erasing unit mark in the redundancy bit area of the physical erasing unit to recognize that the physical erasing unit storing the system data. It should be noted that because the system data is very important for the memory storage apparatus 100, in a case where the rewritable non-volatile memory module 106 is a MLC or TLC NAND memory module, the memory controller 104 (or the memory management circuit 202) only uses lower physical programming units of the system physical erasing unit to store the system data, thereby ensuring the reliability of the system data.

The physical erasing units logically belonging to the replacement area 408 are replacement physical erasing units. For example, when the rewritable non-volatile memory module 106 is manufactured in the factory, 4% of the physical erasing units thereof are reserved for replacement. Namely, when any physical erasing unit in the data area 402, the spare area 404, and the system area 406 is damaged, a physical erasing unit in the replacement area 408 is used for replacing the damaged physical erasing unit (i.e., the bad physical erasing unit). Thus, if there are still normal physical erasing units in the replacement area 408 and a physical erasing unit is damaged, the memory management circuit 202 gets a normal physical erasing unit from the replacement area 408 for replacing the damaged physical erasing unit. If there is no more normal physical erasing unit in the replacement area 408 and a physical erasing unit is damaged, the memory storage apparatus 100 is announced as being in a write-protect status and cannot be used for writing data anymore.

In particular, the numbers of physical erasing units in the data area 402, the spare area 404, the system area 406 and the replacement area 408 are various based on different memory module standards. Additionally, it has to be understood that the grouping relationships of grouping the physical erasing units into the data area 402, the spare area 404, the system area 406 and the replacement area 408 are dynamically changed during the operation of the memory storage apparatus 100. For example, when a physical erasing unit of the spare area 404 is damaged and replaced by a physical erasing unit of the replacement area 408, the physical erasing unit of the replacement area 408 is associated with the spare area 404.

Referring to FIG. 9, as described above, the physical erasing units of the data area 402 and the spare area 404 are alternated to store data written by the host system 1000. In the present exemplary embodiment, the memory controller 104 (or the memory management circuit 202) attributes a corresponding logical addresses LBA (0)~LBA (H) to map to the physical erasing unit for enabling data access by the host system 1000. Here, each logical address is composed of several sectors. For example, in the exemplary embodiment, each logical address is composed of 4 logical sectors. However, the present invention is not limited thereto, and in another exemplary embodiment of the present invention, each logical address may be composed of 8 or 16 sectors. In this exemplary embodiment, the size of one logical address is the same as the size of one physical programming units and the number of the physical erasing units in the data area 402 and the spare area 404 is larger than the number of the logical addresses.

For example, when the memory controller 104 (or the memory management circuit 202) starts to use the physical erasing unit 304(0) for storing data to be written by the host system 1000, the memory controller 104 (or the memory management circuit 202) writes the data into the physical programming units of the physical erasing unit 304(0) regardless of the logical address that the host system 1000 is about to write the data into; and when the memory controller 104 (or the memory management circuit 202) starts to use the physical erasing unit 304(1) for storing data to be written by the host system 1000, the memory controller 104 (or the memory management circuit 202) writes the data into the physical programming units of the physical erasing unit 304(1) regardless of the logical address that the host system 1000 is about to write the data into. That is, when the host system 1000 is about to store data in the memory storage apparatus 100, the memory controller 104 (or the memory management circuit 202) uses the physical programming units in one physical erasing unit to write data, and only when the physical programming units in the physical erasing unit have stored data, the memory controller 104 (or the memory management circuit 202) selects another physical erasing unit which is empty and writes the data into the physical programming units of the newly selected physical erasing unit.

In order to identify which physical programming units are used for storing data stored into the logical addresses, in the exemplary embodiment, the memory controller 104 (or the memory management circuit 202) recodes mapping between the logical addresses and the physical programming units. And, when the host system 1000 is about to access data at a logical sector, the memory controller 104 (or the memory management circuit 202) identifies a logical address that the logical sector belongs to, and therefore accesses data at a physical programming unit mapping to the logical address. For example, in the present exemplary embodiment, the memory controller 104 (or the memory management circuit 202) may stores a logical address mapping table in the system area 406 to record physical programming unit mapping to the logical addresses, and when accessing data, the memory controller 104 (or the memory management circuit 202) loads the logical address mapping table to the buffer memory for updating.

Figure 10:
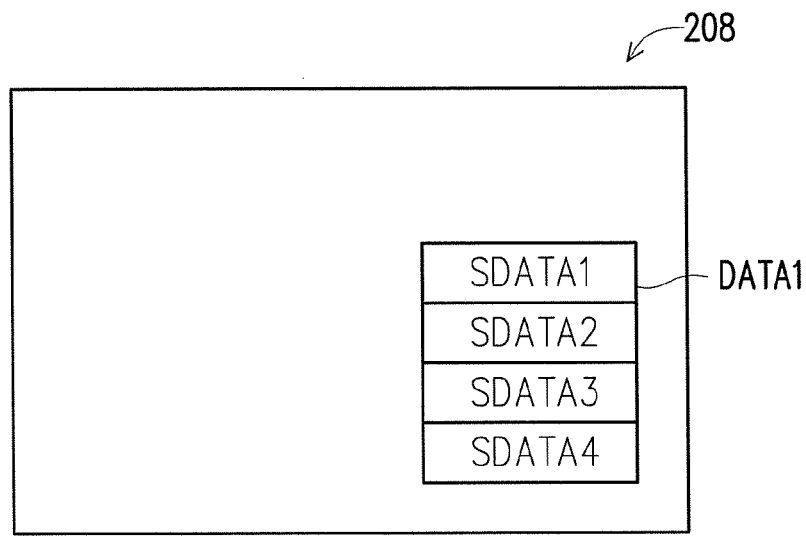
FIGS. 10~12 are diagrams illustrating an example of writing data into physical programming unit according to an example.
Figure 11:
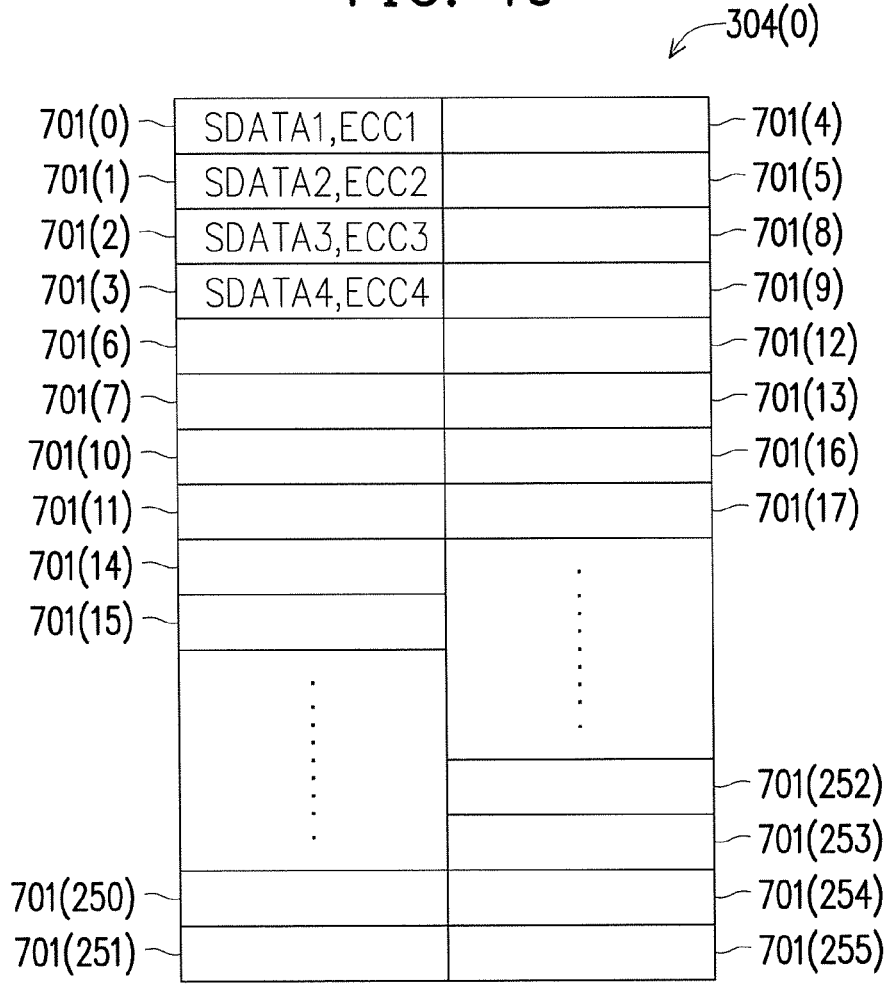
Figure 12:
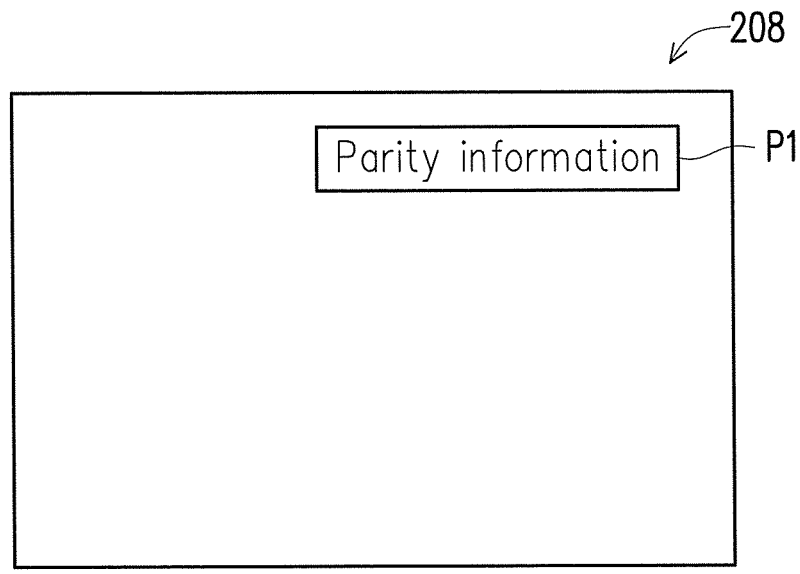

FIGS. 10~12 are diagrams illustrating an example of writing data into physical programming unit according to an example.

Referring to FIG. 10~12, when a write command (hereinafter referred to as "the first write command") and data DATA1 to be stored into the logical addresses LBA (0)~LBA (3) are received from the host system 1000, the memory controller 104 (or the memory management circuit 202) temporarily stores the data DATA1 into the buffer memory 208 and divides the data DATA1 into sub data streams SDATA1, SDATA2, SDATA3 and SDATA4 based on the size of one physical programming unit. Then, the memory controller 104 (or the error checking and correcting circuit 210) generates error checking and correcting codes ECC1, ECC2, ECC3 and ECC4 respectively for the sub data streams SDATA1, SDATA2, SDATA3 and SDATA4. Then, the memory controller 104 (or the error checking and correcting circuit 210) selects one physical erasing unit (e.g., the physical programming unit 304(0)) and writes sub data streams SDATA1, SDATA2, SDATA3 and SDATA4 and the error checking and correcting codes ECC1, ECC2, ECC3 and ECC4 respectively into the physical programming units 701(0), 701(1), 701(2) and 701(3) of the physical programming unit 304(0). In particular, the memory controller 104 (or the parity information encoding and decoding circuit 212) generate parity information P1 according to the sub data streams SDATA1, SDATA2, SDATA3 and SDATA4. Then, the memory controller 104 (or the memory management circuit 202) stores the parity information P1 into the buffer memory 208 and deletes the sub data streams SDATA1, SDATA2, SDATA3 and SDATA4 from buffer memory 208. To be specific, because the physical programming units 701(0), 701(1), 701(2) and 701(3) storing the sub data streams SDATA1, SDATA2, SDATA3 and SDATA4 are lower physical programming units and the upper physical programming units 701(4), 701(5), 701(8) and 701(9) corresponding to the physical programming units 701(0), 701(1), 701(2) and 701(3) have not been written with data. Therefore, if a program failure occurs on the program operation of the upper physical programming units 701(4), 701(5), 701(8) and 701(9), the data storing in the lower physical programming units 701(0), 701(1), 701(2) and 701(3) may be lost. Accordingly, by storing the parity information P1 corresponding to the sub data streams SDATA1, SDATA2, SDATA3 and SDATA4 instead of the sub data streams SDATA1, SDATA2, SDATA3 and SDATA4 in the buffer memory 208, the storage space of the buffer memory 208 needed for executing write commands can be effectively reduced while the effect of protecting data can be achieved.

Figure 13:
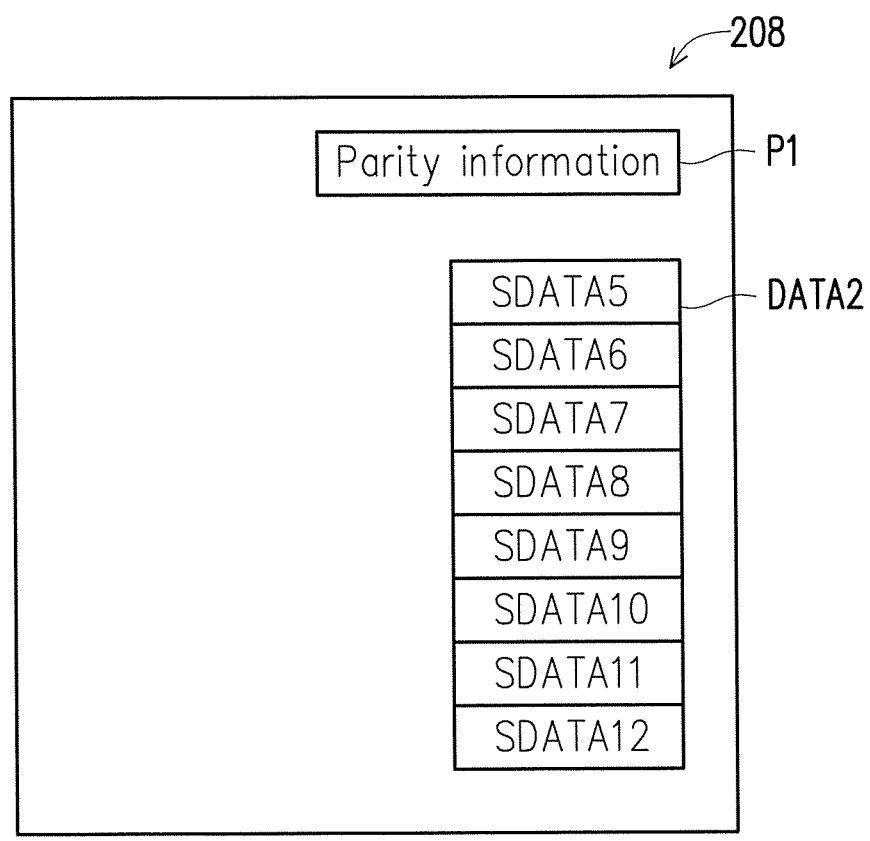
FIGS. 13~15 are diagrams illustrating an example of writing data into physical programming units according another example.
Figure 14:
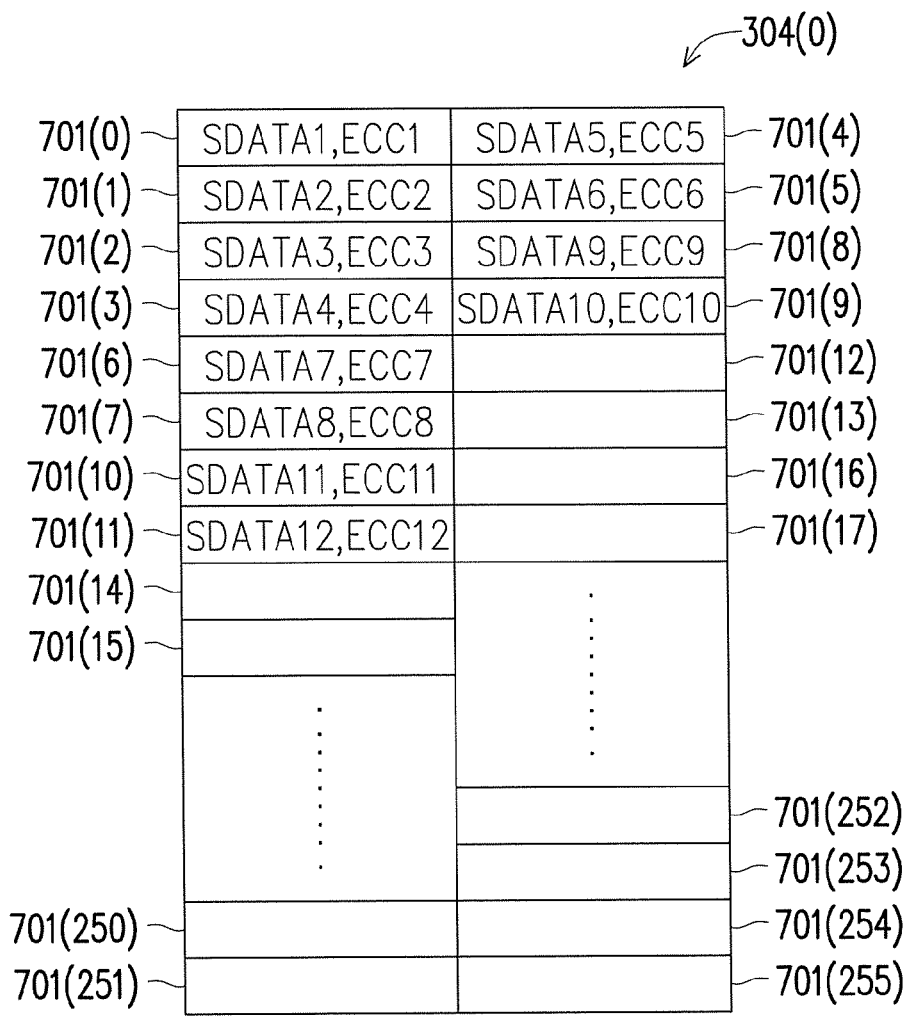
Figure 15:
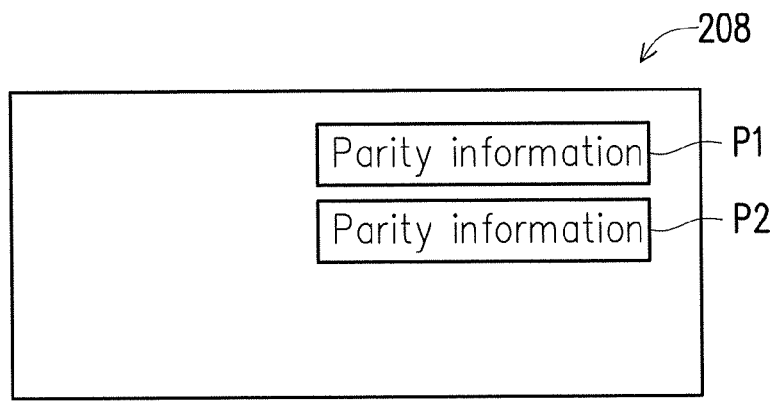

FIGS. 13~15 are diagrams illustrating an example of writing data into physical programming units according another example.

Referring to FIG. 13~15, following the example shown in FIG. 10~12, when a write command (hereinafter referred to as "the second write command") and data SDATA 2 to be stored into the logical addresses LBA(4)~LBA(4) are received from the host system 1000, the memory controller 104 (or the memory management circuit 202) temporarily stores the data SDATA 2 into the buffer memory 208 and divides the data SDATA 1 into sub data streams SDATA5, SDATA6, SDATA7, SDATA 8, SDATA 9, SDATA 10, SDATA 11 and SDATA 12 based on the size of one physical programming unit. Then, the memory controller 104 (or the error checking and correcting circuit 210) generates error checking and correcting codes ECC5, ECC6, ECC7, ECC8, ECC9, ECC10, ECC 11 and ECC12 respectfully for the sub data streams SDATA5, SDATA6, SDATA7, SDATA 8, SDATA 9, SDATA 10, SDATA 11 and SDATA 12. Then, the memory controller 104 (or the memory management circuit 202) writes sub data streams SDATA5, SDATA6, SDATA7, SDATA 8, SDATA 9, SDATA 10, SDATA 11 and SDATA 12 and the error checking and correcting codes ECC5, ECC6, ECC7, ECC8, ECC9, ECC10, ECC 11 and ECC12 respectively into the physical programming units 701(4), 701(5), 701(6), 701(7), 701(8), 701(9), 701(10) and 701(11) of the physical programming unit 304(0). In particular, the memory controller 104 (or the parity information encoding and decoding circuit 212) generates parity information P2 according to the sub data streams SDATA7, SDATA 8, SDATA 11 and SDATA 12. Then, the memory controller 104 (or the memory management circuit 202) stores the parity information P2 into the buffer memory 208 and deletes the sub data streams SDATA5, SDATA6, SDATA7, SDATA 8, SDATA 9, SDATA 10, SDATA 11 and SDATA 12. To be specific, because the physical programming units 701(6), 701(7), 701(10) and 701(11) storing the sub data streams SDATA7, SDATA8, SDATA11 and SDATA12 are lower physical programming units and the upper physical programming units 701(12), 701(13), 701(16) and 701(17) corresponding to the physical programming units 701(6), 701(7), 701(10) and 701(11) have not been written with data. Therefore, if a program failure occurs on the program operation of the upper physical programming units 701(12), 701(13), 701(16) and 701(17), the data storing in the lower physical programming units 701(6), 701(7), 701(10) and 701(11) may be lost. Accordingly, by storing the parity information P2 corresponding to the sub data streams SDATA7, SDATA8, SDATA11 and SDATA12 instead of the sub data streams SDATA7, SDATA8, SDATA11 and SDATA12 in the buffer memory 208, the storage space of the buffer memory 208 needed for executing write commands can be effectively reduced while the effect of protecting data can be achieved.

In another exemplary embodiment, the memory controller 104 (or the memory management circuit 202) may first determine whether the previously stored sub data streams SDATA1, SDATA2, SDATA3 and SDATA4 are correct and if the previously stored sub data streams SDATA1, SDATA2, SDATA3 and SDATA4 are correct, the memory controller 104 (or the memory management circuit 202) deletes the parity information P1. Additionally, in another exemplary embodiment, the memory controller 104 (the memory management circuit 202) may not delete the parity information immediately until the storage space of the buffer memory 208 is not enough for executing next operation.

In the examples shown in FIG. 13~15, if a program failure occurs during the operation of writing the sub data streams SDATA5, SDATA6, SDATA9 or SDATA10 into the physical programming units 701(4), 701(5), 701(8) or 701(9) and error data occurs in the sub data streams SDATA1, SDATA2, SDATA3 or SDATA4 due to the program failure, the memory controller 104 (the memory management circuit 202) may correct the error data based on the parity information P1 and data currently stored in the physical programming units 701(0), 701(1), 701(2) and 701(3). Additionally, because the buffer memory 208 keeps the sub data streams SDATA5, SDATA6, SDATA9 and SDATA10, the sub data streams SDATA5, SDATA6, SDATA9 and SDATA10 will not be lost due to the program failure.

It should be noted that in the present exemplary embodiment, the memory controller 104 (or the memory management circuit 202) may identifies the lower physical programming units corresponding to the un-programmed upper physical programming units and the memory controller 104 (or the parity information encoding and decoding circuit 212) generates parity information based on sub data streams stored into the identified lower physical programming units; however the present invention is not limited thereof. For example, in another exemplary embodiment, the memory controller 104 (or the parity information encoding and decoding circuit 212) generate parity information according to all sub data streams to be written by a write command. Or, in another exemplary embodiment, the memory controller 104 (or the parity information encoding and decoding circuit 212) may generate new parity information according to previous parity information, which is generated according to sub data stream previously written into a physical programming unit, and currently written sub data stream.

Figure 16:
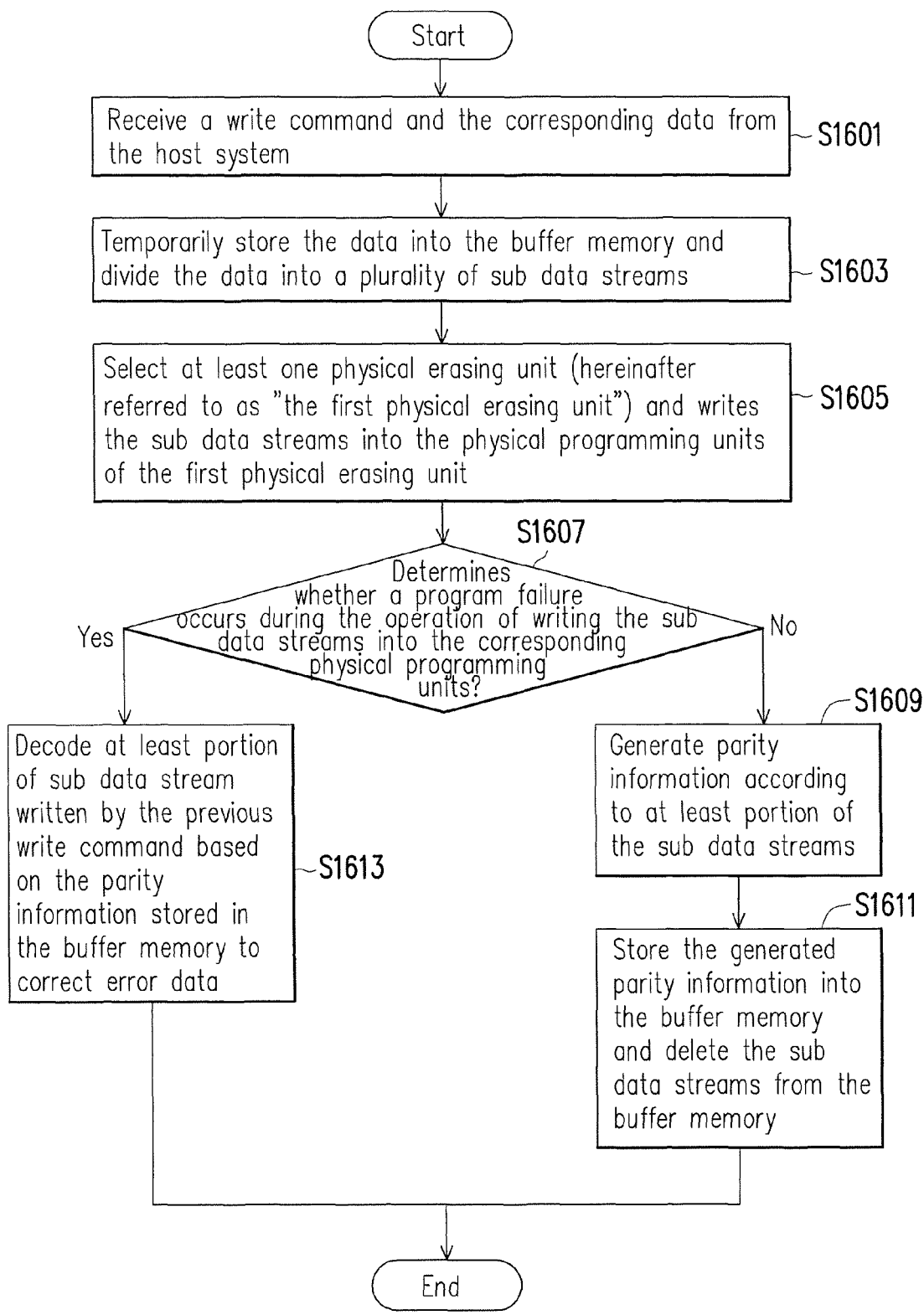
FIG. 16 is a flowchart illustrating a data writing method according to one exemplary embodiment of the present invention.

FIG. 16 is a flowchart illustrating a data writing method according to one exemplary embodiment of the present invention.

Referring to FIG. 16, in step S1601, the memory controller 104 (or the memory management circuit 202) receives a write command and the corresponding data from the host system 1000.

In step S1603, the memory controller 104 (or the memory management circuit 202) temporarily stores the data into the buffer memory 208 and divides the data into a plurality of sub data streams.

In step S1605, the memory controller 104 (or the memory management circuit 202) select at least one physical erasing unit (hereinafter referred to as "the first physical erasing unit") and writes the sub data streams into the physical programming units of the first physical erasing unit. To be specific, the memory controller 104 (or the error checking and correcting circuit 210) generates corresponding error checking and correcting codes respectively for the sub data streams and the memory controller 104 (or the memory management circuit 202) writes the sub data streams and the corresponding error checking and correcting codes into corresponding physical programming units.

In step S1607, the memory controller 104 (or the memory management circuit 202) determines whether a program failure occurs during the operation of writing the sub data streams into the corresponding physical programming units.

If the program failure does not occur, in step S1609, the memory controller 104 (or the parity information encoding and decoding circuit 212) generates parity information according to at least portion of the sub data streams. For example, as described above, the memory controller 104 (or the memory management circuit 202) may identifies lower physical programming units (hereinafter referred to as "the first lower physical programming units") corresponding to the un-programmed upper programming units (hereinafter referred to as "the first upper physical programming units") among the lower physical programming units storing the sub data streams and generates parity information according to the sub data streams stored into the first lower physical programming units.

In step S1611, the memory controller 104 (or the memory management circuit 202) stores the generated parity information into the buffer memory 208 and deletes the sub data streams from the buffer memory 208. In particular, if the buffer memory 208 stores old parity information generated during the executing of a previous write command, in step S1611, the memory controller 104 (or the memory management circuit 202) may delete the old parity information.

If the program failure occurs, in step S1613, the memory controller 104 (or the parity information encoding and decoding circuit 212) decodes at least portion of sub data stream written by the previous write command based on the parity information stored in the buffer memory 208 to correct error data. Then, the memory controller 104 (or the memory management circuit 202) may re-execute related programming operations.

In view of the above, the data writing method, and the memory controller described in the embodiments of the present invention can effectively use the storage space of the buffer memory to executer write commands and prevent data from losing. Additionally, the memory storage apparatus using the method described in the embodiments of the present invention can successfully execute write commands with a smaller buffer memory and prevent data from losing. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A data writing method for writing data into a rewritable non-volatile memory module, wherein the rewritable non-volatile memory module includes at least one memory die, the memory die includes a plurality of physical erasing units, wherein each of the physical erasing units includes a plurality of physical programming units, the data writing method comprising:
   receiving a first write command and first data corresponding to the first write command and temporarily storing the first data into a buffer memory, wherein the first data includes a plurality of sub data streams,
   transmitting the sub data streams from the buffer memory to the rewritable non-volatile memory module to write the sub data streams into at least one first physical erasing unit among the physical erasing units;
   generating parity information based on at least a portion of the sub data streams;
   storing the parity information into the buffer memory; and
   deleting the first data from the buffer memory while temporarily keeping the parity information in the buffer memory after transmitting the sub data streams from the buffer memory to the rewritable non-volatile memory module to write the sub data streams into the at least one first physical erasing unit among the physical erasing units.

2. The data writing method according to claim 1, wherein the step of generating the parity information based on the at least portion of the sub data streams comprises:
   generating the parity information based on all of the sub data streams.

3. The data writing method according to claim 1, wherein the physical programming units of each of the physical erasing units includes a plurality of lower physical programming units and a plurality of upper physical programming units, and a speed of writing data into the lower physical programming units is faster than a speed of writing data into the upper physical programming units,
   wherein the step of generating the parity information based on the at least portion of the sub data streams comprises:
   identifying at least one first sub data stream among the sub data streams according to the physical programming units storing the sub data streams, wherein the at least one first sub data stream is stored in at least one first lower physical programming unit among the lower physical programming units and at least one first upper physical programming unit corresponding to the at least one first lower physical programming unit does not store data; and
   generating the parity information based on the at least one first sub data stream.

4. The data writing method according to claim 1 further comprising:
   after storing the parity information into the buffer memory and deleting the first data from the buffer memory, receiving a second write command and second data corresponding to the second write command from the host system.

5. The data writing method according to claim 4 further comprising:
   determining whether a program failure occurs during an operation of writing the second data into the at least one first physical erasing unit from the buffer memory; and
   if the program failure occurs during the operation of writing the second data into the at least one first physical erasing unit from the buffer memory, decoding the at least portion of sub data streams stored in the at least one first physical erasing unit with the parity information stored in the buffer memory to correct at least one error among the at least a portion of sub data streams.

6. The data writing method according to claim 5 further comprising:
if the program failure does not occur during the operation of writing the second data into the at least one first physical erasing unit from the buffer memory, deleting the parity information from the buffer memory.

7. The data writing method according to claim 4 further comprising:
generating another parity information based on at least portion of the second data; and
storing the another parity information into the buffer memory and deleting the second data from the buffer memory.

8. The data writing method according to claim 1, wherein the step of transmitting the sub data streams from the buffer memory to the rewritable non-volatile memory module to write the sub data streams into the at least one first physical erasing unit among the physical erasing units comprises:
respectively generating a plurality of error checking and correcting codes for the sub data streams; and
transmitting the sub data streams and the error checking and correcting codes respectively corresponding to the sub data streams to the rewritable non-volatile memory module to write the sub data streams and the error checking and correcting codes respectively corresponding to the sub data streams into the physical programming units of the at least one first physical erasing unit.

9. The data writing method according to claim 1, wherein the step of generating the parity information based on the at least portion of the sub data streams comprises:
when one of the sub data streams is written into the at least one first physical erasing unit, generating the parity information based on the one of the sub data streams and a previous parity information.

10. A memory controller for controlling a rewritable non-volatile memory module, the memory controller comprising:
a host interface configured to be coupled to a host system;
a memory interface configured to be coupled to the rewritable non-volatile memory module, wherein the rewritable non-volatile memory module includes at least one memory die, the memory die includes a plurality of physical erasing units, and each of the physical erasing units includes a plurality of physical programming units;
a buffer memory;
a parity information encoding and decoding circuit; and
a memory management circuit coupled to the host interface, the memory interface, the buffer memory, and the parity information encoding and decoding circuit,
wherein the memory management circuit is configured to receive a first write command and first data corresponding to the first write command and temporarily store the first data into the buffer memory, wherein the first data includes a plurality of sub data streams,
wherein the memory management circuit is further configured to transmit the sub data streams from the buffer memory to the rewritable non-volatile memory module to write the sub data streams into at least one first physical erasing unit,
wherein the parity information encoding and decoding circuit is configured to generate parity information based on at least portion of the sub data streams,
wherein the memory management circuit is further configured to store the parity information into the buffer memory, and
wherein the memory management circuit is further configured to delete the first data from the buffer memory while temporarily keeping the parity information in the buffer memory after transmitting the sub data streams from the buffer memory to the rewritable non-volatile memory module to write the sub data streams into the at least one first physical erasing unit among the physical erasing units.

11. The memory controller according to claim 10, in the operation of generating the parity information based on the at least portion of the sub data streams comprises, the parity information encoding and decoding circuit generates the parity information based on all of the sub data streams.

12. The memory controller according to claim 10,
wherein the physical programming units of each of the physical erasing units includes a plurality of lower physical programming units and a plurality of upper physical programming units, and a speed of writing data into the lower physical programming units is faster than a speed of writing data into the upper physical programming units,
wherein in the operation of generating the parity information based on the at least portion of the sub data streams comprises, the memory management circuit identifies at least one first sub data stream among the sub data streams according to the physical programming units storing the sub data streams, and the parity information encoding and decoding circuit generates the parity information based on the at least one first sub data stream,
wherein the at least one first sub data stream is stored in at least one first lower physical programming unit among the lower physical programming unit and at least one first upper physical programming unit corresponding to the at least one first lower physical programming unit does not store data.

13. The memory controller according to claim 10,
wherein the memory management circuit is further configured to receive a second write command and second data corresponding to the second write command from the host system after storing the parity information into the buffer memory and deleting the first data from the buffer memory.

14. The memory controller according to claim 13,
the memory management circuit is configured to generate another parity information based on at least portion of the second data, store the another parity information into the buffer memory and delete the second data from the buffer memory.

15. The memory controller according to claim 10,
wherein in the operation of generating the parity information based on the at least portion of the sub data streams comprises, every when one of the sub data streams is written into the at least one first physical erasing unit, the parity information encoding and decoding circuit generates the parity information based on the one of the sub data streams and a previous parity information.

16. A memory storage apparatus, comprising:
a connector coupled to a host system;
a rewritable non-volatile memory module having at least one memory die, wherein the memory die has a plurality of physical erasing units, and each of the physical erasing units includes a plurality of physical programming units; and a memory controller having a buffer memory, wherein the memory controller is coupled to the connector and the rewritable non-volatile memory module, wherein the memory controller is configured to receive a first write command and first data corresponding to the first write command and temporarily store the first data into the buffer memory, wherein the first data includes a plurality of sub data streams, wherein the memory controller is further configured to transmit the sub data streams from the buffer memory to the rewritable non-volatile memory module to write the sub data streams into at least one first physical erasing unit, wherein the memory controller is configured to generate parity information based on at least a portion of the sub data streams, wherein the memory controller is further configured to store the parity information into the buffer memory, and wherein the memory controller is further configured to delete the first data from the buffer memory while temporarily keeping the parity information in the buffer memory after transmitting the sub data streams from the buffer memory to the rewritable non-volatile memory module to write the sub data streams into the at least one first physical erasing unit among the physical erasing units.

17. The memory storage apparatus according to claim 16, wherein in the operation of generating the parity information based on the at least portion of the sub data streams comprises, the memory controller generates the parity information based on all of the sub data streams.

18. The memory storage apparatus according to claim 16, wherein the physical programming units of each of the physical erasing units includes a plurality of lower physical programming units and a plurality of upper physical programming units, and a speed of writing data into the lower physical programming units is faster than a speed of writing data into the upper physical programming units, wherein in the operation of generating the parity information based on the at least portion of the sub data streams comprises, the memory controller identifies at least one first sub data stream among the sub data streams according to the physical programming units storing the sub data streams, and the memory controller generates the parity information based on the at least one first sub data stream, wherein the at least one first sub data stream is stored in at least one first lower physical programming unit among the lower physical programming unit and at least one first upper physical programming unit corresponding to the at least one first lower physical programming unit does not store data.

19. The memory storage apparatus according to claim 16, wherein the memory controller is further configured to receive a second write command and second data corresponding to the second write command from the host system after storing the parity information into the buffer memory and deleting the first data from the buffer memory.

20. The memory storage apparatus according to claim 19, wherein the memory controller is further configured to determine whether a program failure occurs during the operation of writing the second data into the at least one first physical erasing unit from the buffer memory, wherein if the program failure occurs during the operation of writing the second data into the at least one first physical erasing unit from the buffer memory, the memory controller decodes the at least portion of sub data streams stored in the at least one first physical erasing unit with the parity information stored in the buffer memory to correct at least one error among the at least a portion of sub data streams.

21. The memory storage apparatus according to claim 20, wherein if the program failure does not occur during the operation of writing the second data into the at least one first physical erasing unit from the buffer memory, the memory controller is further configured to delete the parity information from the buffer memory.

22. The memory storage apparatus according to claim 19, wherein the memory controller is configured to generate another parity information based on at least portion of the second data, store the another parity information into the buffer memory and delete the second data from the buffer memory.

23. The memory storage apparatus according to claim 16, wherein the memory controller is configured to respectively generate a plurality of error checking and correcting codes for the sub data streams, wherein in the operation of transmitting the sub data streams from the buffer memory to the rewritable non-volatile memory module to write the sub data streams into the at least one first physical erasing unit, the memory controller transmits the sub data streams and the error checking and correcting codes respectively corresponding to the sub data streams to the rewritable non-volatile memory module to write the sub data streams and the error checking and correcting codes respectively corresponding to the sub data streams into the physical programming units of the at least one first physical erasing unit.

24. The memory storage apparatus according to claim 16, wherein in the operation of generating the parity information based on the at least portion of the sub data streams comprises, every when one of the sub data streams is written into the at least one first physical erasing unit, the memory controller generates the parity information based on the one of the sub data streams and a previous parity information.

* * * * *